Patented Oct. 18, 1938

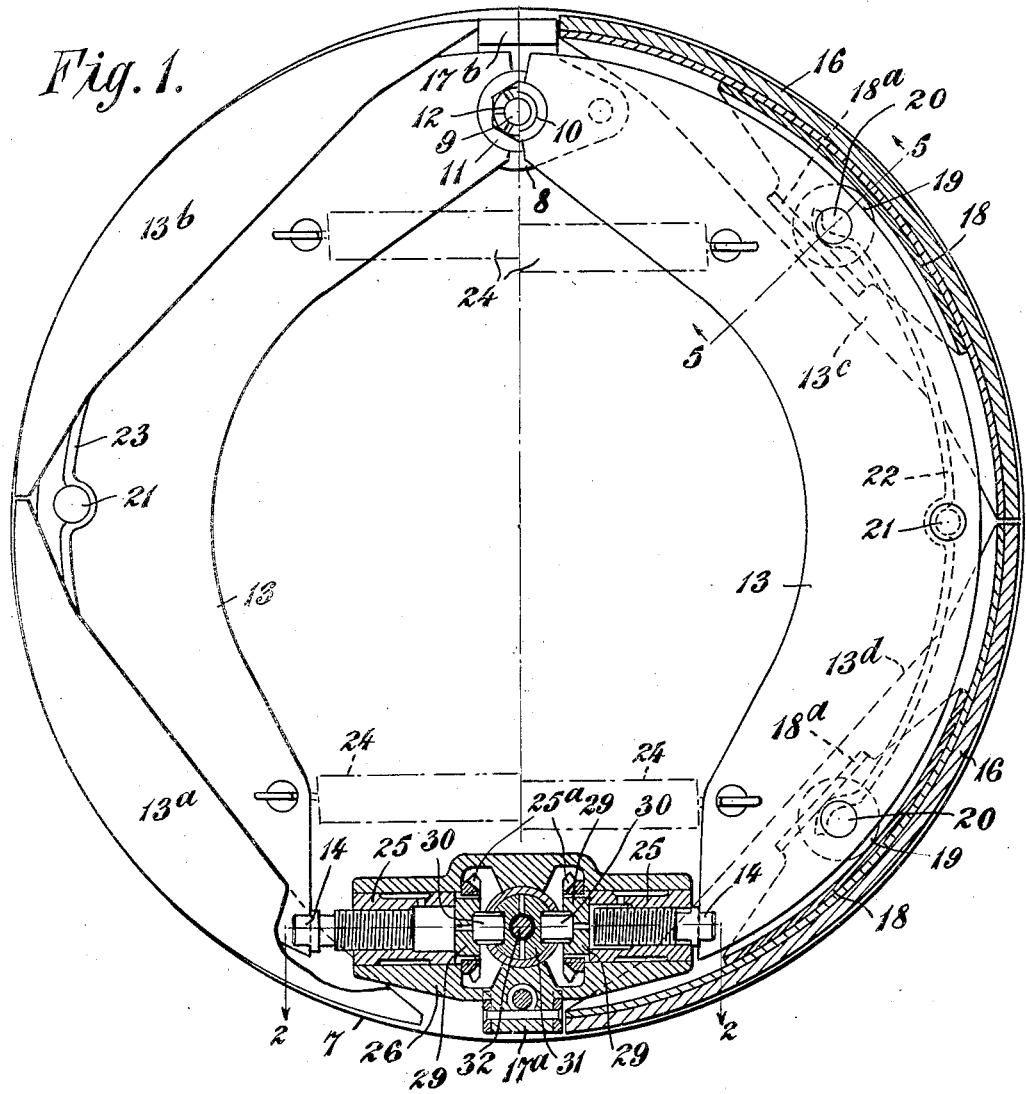
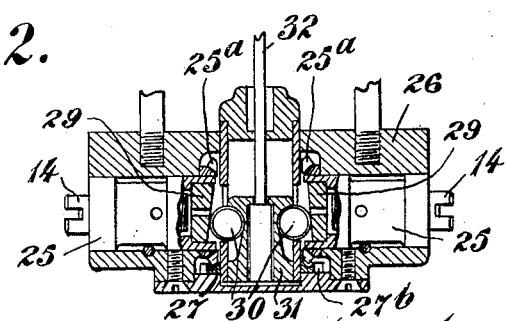

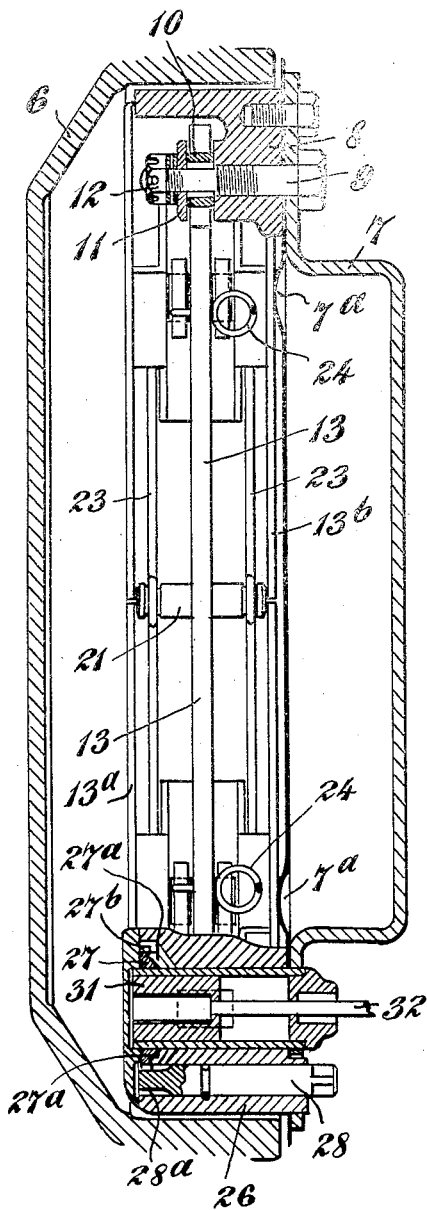
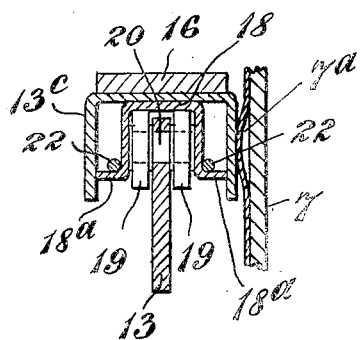
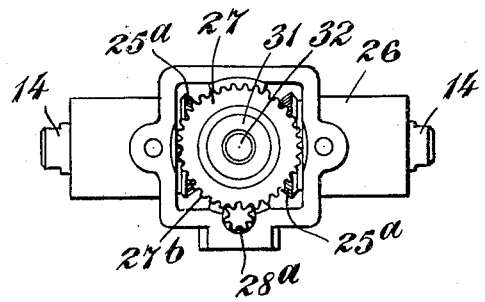

2,133,669

UNITED STATES PATENT OFFICE 2,133,669

INTERNALLY EXPANDING BRAKE

James Henry Pratt, Gilbert Edgar Manley, and Albert Henry Godfrey Girling, Birmingham, England Application April 20, 1937, Serial No. 137,992
In Great Britain February 18, 1937

2 Claims. (Cl. 188—78)

This invention has reference to improvements relating to internally expanding brakes and has for its object the provision of an improved brake of this kind which provides for a more powerful braking effort than heretofore without involving the use of a Servo motor and which inter alia ensures equal wearing of the brake linings and enables a relatively lighter drum to be employed than with the constructions of internally expanding brakes heretofore in use.

The invention consists of an improved internally expanding brake which incorporates four or more brake shoes the combined length of the arcs of which is substantially equal to the circumference of the drum, said shoes being oppositely arranged and adapted for a limited sliding circumferential movement when the brake is applied whereby a powerful self-energizing braking effort is provided.

The invention further resides in an improved brake of the internally expanding type having four arcuate brake shoes the braking surface whereof extends substantially completely around the circumference of the brake drum said brake shoes being arranged in pairs and being capable of a limited sliding movement relatively to the anchor plate and being operatively connected to a pair of actuating levers by means, preferably a spring means, which permits both a circumferential and also a rocking movement of the shoes to obtain substantially about the centres thereof.

The invention still further resides in the details of construction of the improved internally expanding brake to be described hereinafter.

The invention will now be described with particular reference to the accompanying sheet of drawings, wherein:—

Figure 1 is a part sectional front elevation of the improved internally expanding brake.

Figure 2 is a fragmentary view in sectional plan of the expansion mechanism for the brake shoes.

Figure 3 is a longitudinal vertical section of the brake illustrated in Figure 1.

Figure 4 is a fragmentary view showing the rear of the expansion mechanism for the brake shoes with the cover plate removed, and Figure 5 is a fragmentary view in section taken on the plane indicated by the line 5—5 Figure 1.

As illustrated in the drawings the improved brake comprises a drum 6 which is adapted to be fixed to the vehicle wheel in known manner and a carrier plate 7 which carries the mechanism now to be described and which is fixed to the vehicle. The carrier plate 7 has bolted thereto a block 8 and one of the securing bolts 9 employed for this purpose projects inwardly from the said block 8 and has located around a plain portion of the shank thereof a bearing sleeve 10 which is normally held in frictional contact with the adjacent face of the block 8 by means of a washer 11 and nut 12 said nut 12 engaging a threaded portion on the end of the said bolt 9. The sleeve 10 serves as an abutment for the upper ends of a pair of oppositely arranged actuating levers 13 the lower ends of which abut oppositely movable thrust exerting members 14 which can be moved outwardly when required for expanding the brake by an expansion mechanism which will be described in detail hereinafter. Each actuating lever 13 co-operates with a pair of brake shoes 13$^a$ and 13$^b$; 13$^c$ and 13$^d$ respectively and these brake shoes carry on the peripheries strips 16 of material having a high co-efficient of friction the combined lengths of the said strips 16 being substantially equal to the inner circumference of the drum 6. The adjacent ends of the rearwardly presented shoes 13$^a$, 13$^b$ abut, likewise the adjacent ends of the forwardly presented shoes 13$^c$, 13$^d$, and the lower ends of the two shoes 13$^a$, 13$^d$ co-operate with a fixed abutment 17$^a$ carried by the carrier plate 7 and a similar diametrically opposed abutment 17$^b$ is carried by the block 8 for contact by the upper ends of the upper shoes 13$^b$, 13$^c$. Each brake shoe 13$^a$, 13$^b$, 13$^c$ and 13$^d$ is of an inverted U-shape in cross section, see Figure 5, with an internally disposed U-shaped bracket 18 which rests on the peripheries of a pair of centrally disposed rollers 19 mounted on a spindle 20 which passes through the respective actuating lever 13. Pivoted to the centres of the actuating levers 13 are pins 21 which serve as pivots for springs 22, 23 having curved ends which bear on side flanges 18$^a$ of the respective bearing brackets 18 and tend to maintain the said bearing brackets 18 in contact with the peripheries of the respective rollers 19. The springs 22 and 23 tend to resist any tendency of the shoes 13$^a$, 13$^b$, 13$^c$ and 13$^d$ to slide circumferentially but readily permit of the rocking of the shoes. The brake actuating levers 13 are interconnected by means of springs 24 which tend to maintain the shoes 13$^a$, 13$^b$, 13$^c$ and 13$^d$ out of contact with the drum 6 said springs 24 being located on one side of the actuating levers so that a canting tendency is introduced which is resisted by the contact of the shoes with raised portions 7$^a$ carried by the carrier plate 7.

The brake actuating levers 13 are proportioned according to known tenets to ensure exactly equal wear on the brake linings 16.

The thrust exerting members 14 are provided with screw threaded shanks which engage with the tapped bores of sleeves 25 which are rotatably mounted within a housing 26 secured to the carrier plate 7. At their inner ends the sleeves 25 are provided with bevel teeth 25a which mesh with bevel teeth 27a carried by a toothed annulus 27 having spur teeth 27b which mesh with teeth 28a carried by a spindle 28 which is rotatably mounted in the housing 26 and which is adapted for rotation by means of a key applied to the shaped outer projecting end of the said spindle 28. Disposed within the inner ends of the sleeves 25 are blocks 29 having inclined plane surfaces with which contact freely movable rollers 30 the diametrically opposite portions of which contact with correspondingly inclined plane surfaces carried by a wedge member 31 adapted to be actuated by a rod 32 in known manner.

The operation of the invention is as follows:—

Upon the application of the brake when the vehicle is moving in a forward direction due to the wedge member 31 being caused to move in an inward direction and, through the rollers 30, blocks 29, sleeves 25 and thrust exerting members 14, to effect an expansion of the actuating levers 13 against the resistance of the springs 24, the first application of the brake results in the bearing sleeve 10 locating itself relatively to the plain portion of the bolt 9 so as to centralize the whole of the mechanism. The upper brake shoe 13b of the rearwardly presented pair of brake shoes 13a, 13b is pushed into contact with the abutment 17b by its complementary brake shoe 13a, the lower brake shoe 13d of the forwardly presented pair of brake shoes 13c, 13d being pushed into contact with the abutment 17a by its complementary shoe 13c. This circumferential movement of the brake shoes adds a powerful self-energizing braking effort to the braking effort provided by the expansion of the actuating levers 13. A reverse circumferential movement of the brake shoes 13a, 13b, 13c, 13d takes place when the brakes are applied with the vehicle moving in a reverse direction in which case the opposite sides of the abutments 17a and 17b come into play.

It will be appreciated that the life of the brake linings 16 is materially increased over that of two brake shoe internally expanding brakes by reason of the increased area of contact between the four brake shoes 13a, 13b, 13c and 13d and the drum 6.

It is found also that the short lengths of the arcs of the strips 16 enables the whole of the frictional material to be utilized and the proportioning of the actuating levers 13 ensures equal wearing of the lining of all shoes so that more than twice the usable volume of frictional material is made use of than with ordinary two brake shoe internally expanding brakes.

Furthermore, it is found that the even radial pressure exerted by the substantially continuous surface contacts eliminates drum distortion and permits a lighter drum 6 to be used and also a higher ratio between the travel of the driver's foot when operating the brake and the resultant movement of the brake shoes for applying the brake.

Moreover, it is found that the rocking permitted to the shoes 13a, 13b, 13c, 13d, about the central pivots provided by the rollers 19 equalizes the pressure at each end of the shoes and reduces the amount of clearance necessary to prevent rubbing or contact in the event of drum distortion.

It will be appreciated that the actuating levers 13 are isolated from any braking effort and serve merely to control the actuation of the brake shoes.

We claim:—

1. An internal expanding brake comprising a brake drum, a relatively fixed carrier plate, a fixed projection carried by said plate, a sleeve of greater diameter disposed around said projection, a frictional means for resisting the movement of said sleeve, a pair of oppositely arranged actuating levers mounted on said carrier plate having adjacent ends thereof in contact with the sleeve, an expansion means adapted to exert a thrust on the other adjacent ends of the actuating levers, rollers carried by the actuating levers, brake shoes rockably mounted at their central portions on said rollers and capable of a circumferential movement relatively to said levers, spring means anchored to each actuating lever for maintaining each respective pair of brake shoes in contact with the rollers carried by said actuating levers and means for restoring the actuating levers to the out of action position when the brake is released, the combined lengths of the arcs of the arcuate brake shoes approximating to the circumference of the drum, said circumferential movement adding a powerful self-energizing braking effort to the braking effort provided by the expanding means.

2. An internal expanding brake according to claim 1 wherein the restoring springs are arranged on one side of the actuating levers to produce a canting effect and wherein fixed abutments are provided for resisting said canting.

JAMES HENRY PRATT.
GILBERT EDGAR MANLEY.
ALBERT HENRY GODFREY GIRLING.